United States Patent
Kingdon et al.

[11] Patent Number: 6,002,932
[45] Date of Patent: Dec. 14, 1999

[54] SYSTEM AND METHOD FOR MOBILE TERMINAL POSITIONING

[75] Inventors: Christopher H. Kingdon, Garland; Bagher R. Zadeh, Dallas; Maya Roel-Ng, Plano; Stephen Hayes, Carrollton, all of Tex.

[73] Assignee: Ericsson Inc., Research Triangle Park, N.C.

[21] Appl. No.: 08/978,956

[22] Filed: Nov. 26, 1997

[51] Int. Cl.[6] .................................................. H04Q 7/20
[52] U.S. Cl. .......................... 455/433; 455/432; 455/435; 455/436
[58] Field of Search .................................. 455/422, 432, 455/433, 435, 436, 456, 461, 517, 560; 342/450, 457

[56] References Cited

U.S. PATENT DOCUMENTS

| | | | |
|---|---|---|---|
| 5,519,758 | 5/1996 | Tabbane | 455/456 |
| 5,539,922 | 7/1996 | Wang | 455/456 |
| 5,590,175 | 12/1996 | Gallant et al. | 455/433 |
| 5,610,972 | 3/1997 | Emery et al. | 455/433 |
| 5,619,552 | 4/1997 | Karppanen et al. | 455/433 |
| 5,710,805 | 1/1998 | Armbruster et al. | 455/433 |
| 5,915,219 | 6/1999 | Poyhonen | 455/436 |
| 5,924,041 | 7/1999 | Alperovich et al. | 455/456 |

*Primary Examiner*—Dwayne D. Bost
*Assistant Examiner*—Nay Maung
*Attorney, Agent, or Firm*—Jenkens & Gilchrist, P.C.

[57] ABSTRACT

A telecommunications system and method is disclosed for determining the address of both the home and serving Mobile Positioning Centers (MPCs). Each Mobile Switching Center/Visitor Location Register (MSC/VLR) and Home Location Register (HLR) within a Public Land Mobile Network (PLMN) will be provided with the MPC address that is valid for its PLMN. When a Mobile Station (MS) roams into a new (serving) PLMN, a Location Update is performed by the serving MSC/VLR to the Home Location Register (HLR). The MPC address for the serving MSC/VLR will be included in every location update operation to the HLR, which can then store this serving MPC address in the subscriber's HLR record. Furthermore, the home MPC address, valid for the PLMN of the HLR, is included in every subscriber data transfer operation from the HLR to the serving MSC/VLR, which can then store this home MPC address, in the subscriber's VLR record.

24 Claims, 4 Drawing Sheets

SYSTEM AND METHOD FOR MOBILE TERMINAL POSITIONING

BACKGROUND OF THE PRESENT INVENTION

Field of the Invention

The present invention relates generally to telecommunications systems and methods for determining the location of a mobile terminal within a cellular network, and specifically to determining the location of a mobile terminal that has roamed into a serving network by informing the home and serving networks of the addresses of both the home and serving Mobile Positioning Centers.

BACKGROUND AND OBJECTS OF THE PRESENT INVENTION

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS within a cellular network has recently become important for a wide range of applications. For example, positioning services may be used by transport and taxi companies to determine the location of their vehicles. In addition, for emergency calls, e.g., 911 calls, the exact location of the mobile terminal may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital.

As can be seen in FIG. 2 of the drawings, upon a network positioning request, the Base Station System (BSS) (220 and 240) serving the MS 200 generates positioning data, which is delivered to the Mobile Switching Center (MSC) 260. This positioning data is then forwarded to a Mobile Positioning Center (MPC) 270 for calculation of the geographical location of the MS 200. The location of the MS 200 can then be sent to the application 280 that requested the positioning. Alternatively, the requesting application 280 could be located within the MS 200 itself or within the network (MSC/VLR 260).

In order to accurately determine the location of the MS 200, positioning data from three or more separate Base Transceiver Stations (210, 220, and 230) is required. This positioning data for GSM systems can include, for example, a Timing Advance (TA) value, which corresponds to the amount of time in advance that the MS 200 must send a message in order for the BTS 220 to receive it in the time slot allocated to that MS 200. When a message is sent from the MS 200 to the BTS 220, there is a propagation delay, which depends on the distance between the MS 200 and the BTS 220. TA values are expressed in bit periods, and can range from 0 to 63, with each bit period corresponding to approximately 550 meters between the MS 200 and the BTS 220. It should be understood, however, that any estimate of time, distance, or angle for any cellular system can be used, instead of the TA value discussed herein.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the mobile station 200 can be determined (with certain accuracy) by the Mobile Positioning Center 270.

Therefore, Timing Advance (TA) values are obtained from the original (serving) BTS 220 and two neighboring (target) BTSs (210 and 230). In order for each target BTS (210 and 230) to determine a TA value, a positioning handover to each of the BTSs (210 and 230) must occur. A positioning handover is similar to an ordinary asynchronous handover. The target BTS, e.g., BTS 210, distinguishes the Positioning Handover from an ordinary handover by a new ACTIVATION TYPE in the CHANNEL ACTIVATION message. Unlike an ordinary handover, upon reception of a HANDOVER ACCESS message from the MS 200, the target BTS 210 only calculates the TA value, and does not respond to the mobile station 200, that is, no PHYSICAL INFORMATION is sent to the MS 200. Thus, the MS 200 will then return to the previous channel allocated by the original BTS 220 after the time period defined by the MS's 200 internal counter expires, e.g., 320 milliseconds.

Each GSM PLMN 10 includes at least one Mobile Positioning Center (MPC), which is able to position both the subscribers registered in the HLR served by that MPC and the subscribers roaming in the PLMN served by that MPC. In order to support GSM location services while the subscriber is in the home or a serving PLMN, the home PLMN and the serving PLMN must have knowledge of the address of the Mobile Positioning Center (MPC) that belongs to the subscriber's home PLMN as well as the address of the MPC that belongs to the currently serving PLMN. Existing technology has not provided a method for determining the address of both the home and serving MPC.

It is therefore an object of the invention to determine the address of both the home and serving Mobile Positioning Centers (MPCs) for each mobile subscriber.

It is a further object of the invention to allow the home MPC to obtain the address of the serving MPC and vice versa.

SUMMARY OF THE INVENTION

The present invention is directed to telecommunications systems and methods for determining the address of both the home and serving Mobile Positioning Centers (MPCs). Each MSC/VLR and HLR within a PLMN will be provided with the MPC address that is valid for its PLMN. This MPC address can be administered by command in the serving MSC/VLR and in the HLR. In addition, when a Mobile Station (MS) roams into a new (serving) PLMN, a location update is performed by the serving MSC/VLR to the Home Location Register (HLR). The MPC address for the serving MSC/VLR will be included in every location update operation to the HLR, which can then store this serving MPC address in the subscriber's HLR record. Furthermore, the home MPC address, valid for the PLMN of the HLR, is included in every subscriber data transfer from the HLR to the serving MSC/VLR. The serving MSC/VLR can then store this home MPC address, received in the subscriber data transfer, in the subscriber's VLR record. Therefore, both the HLR and MSC/VLR contain the MPC address for both the home MPC (valid for the HLR) and the serving MPC (valid for the serving MSC/VLR).

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
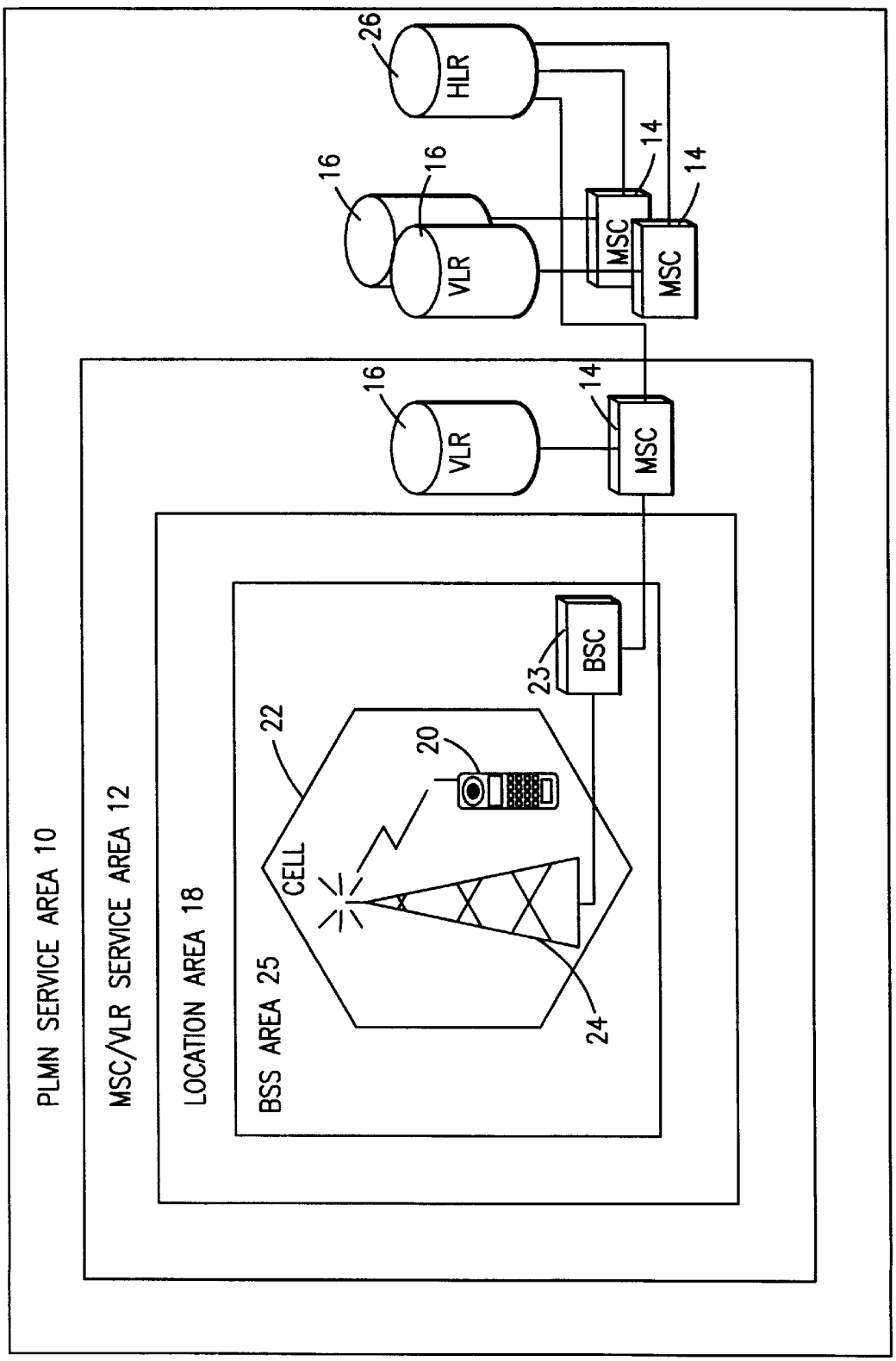
FIG. 1 is a block diagram of a conventional terrestrially-based wireless telecommunications system.
Figure 2:
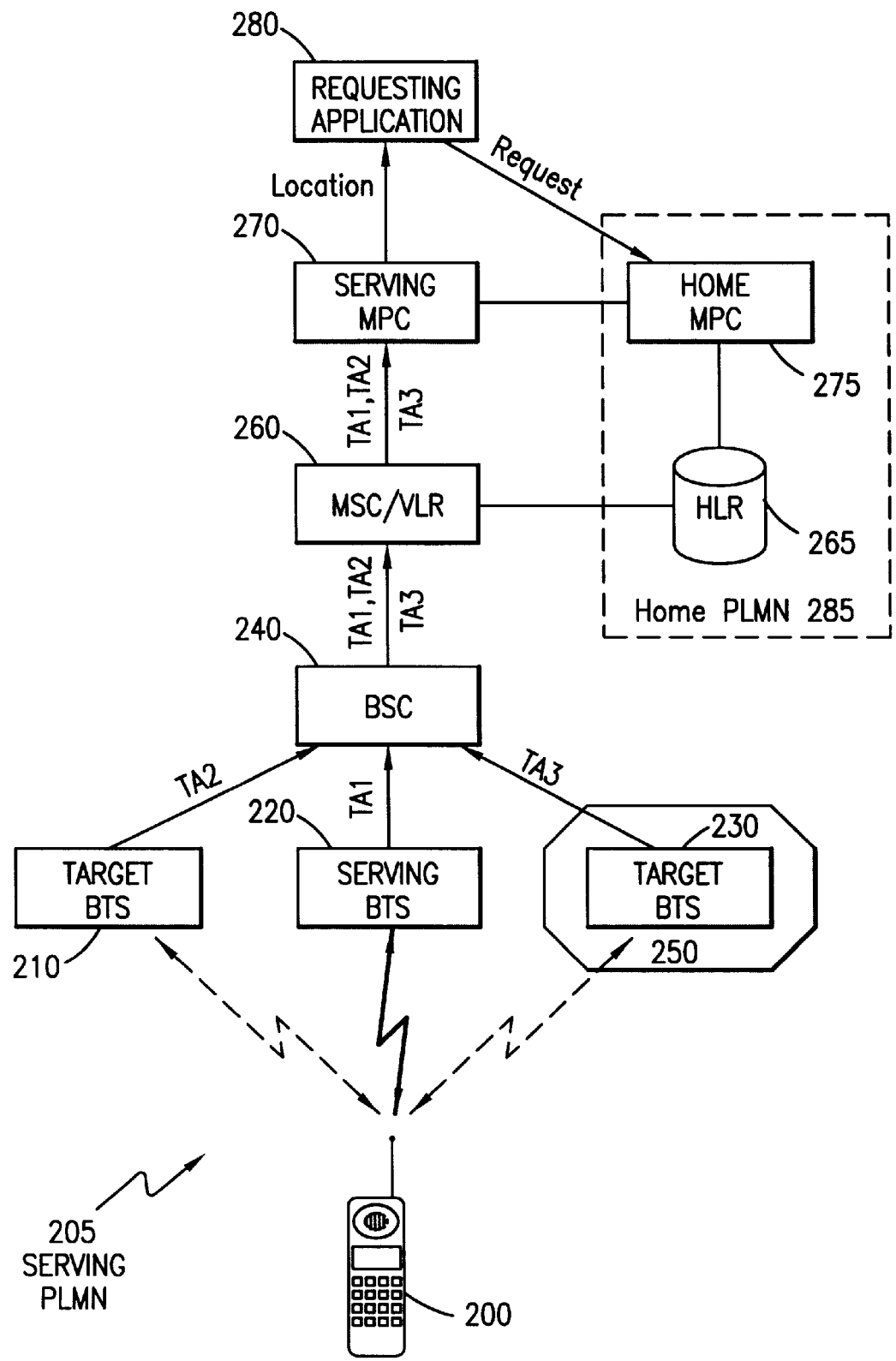
FIG. 2 illustrates a sample positioning handover in which positioning data is acquired by a target base transceiver station and transmitted to a serving base station controller.
Figure 3:
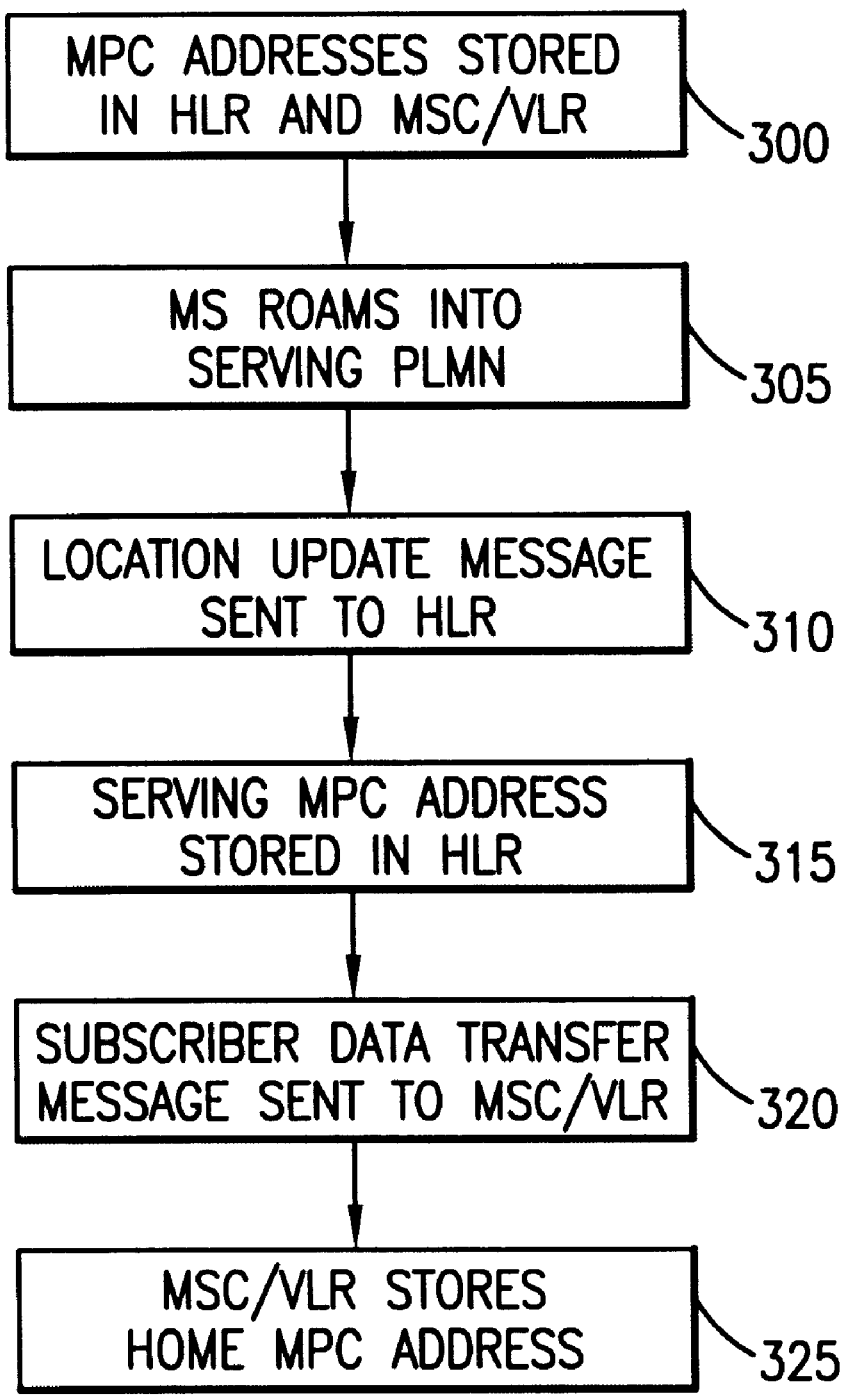
FIG. 3 demonstrates steps in a sample location update operation in which the addresses of both the home and serving Mobile Positioning Centers are exchanged between the home and serving networks in accordance with preferred embodiments of the present invention.

With reference now to FIG. 3 of the drawings, each Mobile Switching Center/Visitor Location Register (MSC/VLR) 260 and Home Location Register (HLR) 265 within a Public Land Mobile Network (PLMN) 205 and 285, respectively, is provided with the address for a Mobile Positioning Center (MPC) 270 and 275, respectively that is valid for its PLMN 205 and 285, respectively (step 300). This MPC address can be administered by command in every MSC/VLR 260 and HLR 265. When a Mobile Station (MS) 200 roams into a new (serving) PLMN 205 (step 305), a location update message is sent by the serving MSC/VLR 260 to the Home Location Register 265 (HLR) (step 310) to inform the HLR 265 of the current location of the MS 200. The MPC address for the serving MSC/VLR 260 is included in every location update operation to the HLR 265, which can then store this serving MPC address in the subscriber's HLR record as the serving MPC address (step 315). Furthermore, the home MPC address, valid for the PLMN 285 of the HLR 265, is included in every subscriber data transfer message (step 320) from the HLR 265 to the serving MSC/VLR 260, which includes a current copy of the subscriber's record, e.g., services that the subscriber has purchased. The serving MSC/VLR 260 can then store this home MPC address, received in the subscriber data transfer operation, in the subscriber's VLR record (step 325). Therefore, both the HLR 265 and serving MSC/VLR 260 contain the MPC address for both the home MPC 275 (valid for the HLR 265) and the serving MPC 270 (valid for the serving MSC/VLR 260).

Figure 4:
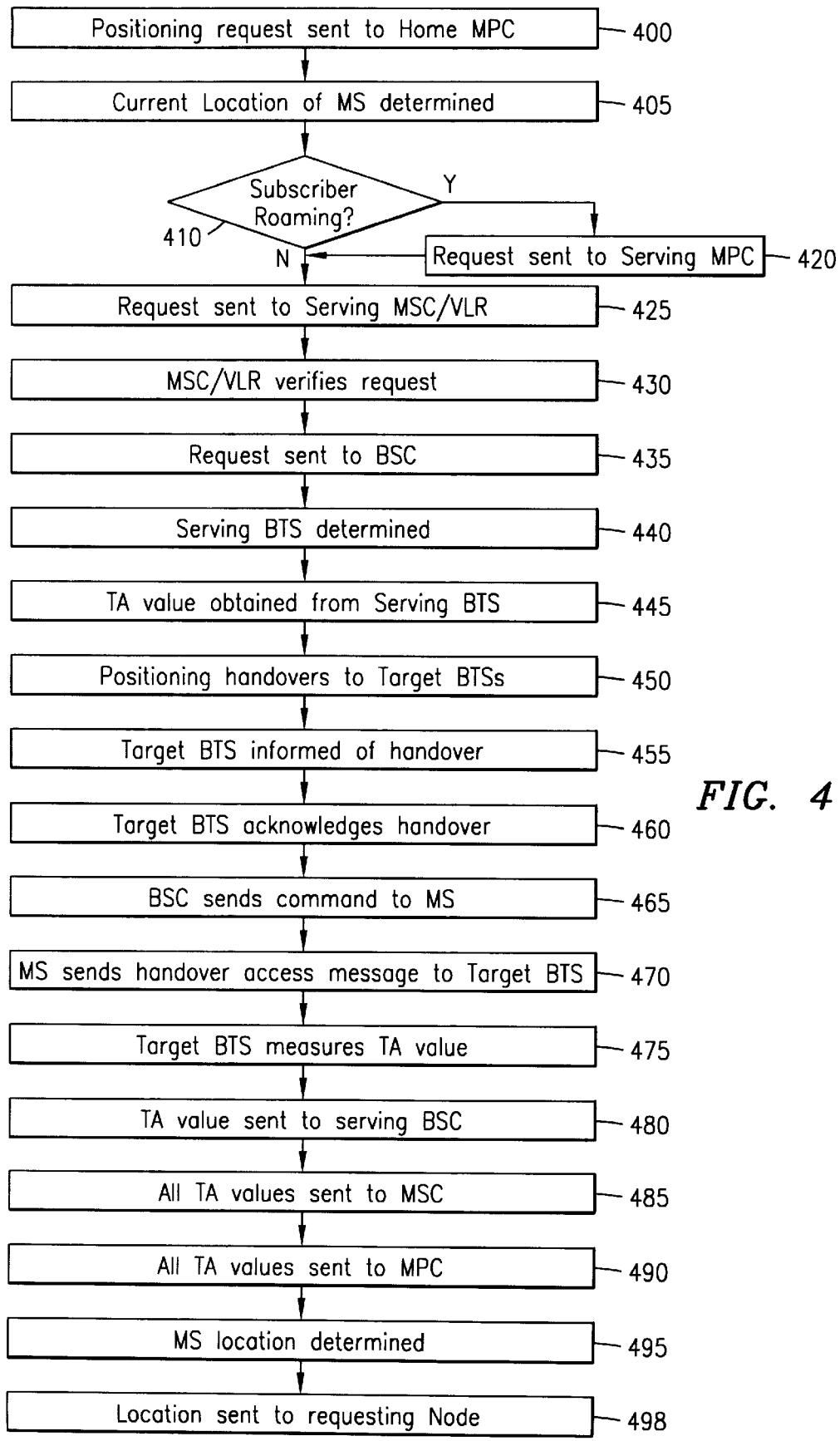
FIG. 4 demonstrates steps in a sample positioning process of a mobile terminal that has roamed outside of its home network, in accordance with preferred embodiments of the present invention.

Therefore, as shown in FIG. 4 of the drawings, when a positioning request comes in to the subscriber's home MPC 275 (step 400), the home MPC 275 will interrogate the Home Location Register 265 (HLR) to determine the current MSC/VLR 260 that the subscriber is registered in (step 405). If the subscriber is roaming outside of the home PLMN 285 (step 410), the subscriber's home MPC 275 will transfer the positioning request to the serving MPC 270 (step 420), which could be located within the serving MSC/VLR 260, or could be a separate node in communication with the MSC/VLR 260. Thereafter, the positioning request is sent to the serving Mobile Switching Center/Visitor Location Register (MSC/VLR) 260 (step 425), which then must verify that the request to collect positioning data for a particular subscriber originated from a valid MPC (serving MPC 270 or home MPC 275) (step 430). This can be accomplished by the serving MSC/VLR 260 checking the MPC address included in the request to collect positioning data and matching this MPC address against either the MPC address of the serving PLMN 205 or the MPC address of the subscriber's home PLMN 285, each of which are stored in the MSC/VLR 260.

After the positioning request is received by the serving MSC/VLR 260 (step 425), and the validity of the MPC address is determined (step 430), the serving MSC/VLR 260 then forwards the positioning request to the BSC 240 (step 435). If the MS 200 is in idle mode, the serving MSC/VLR 260 must page the MS 200 and setup a call to the MS 200 prior to forwarding the positioning request to the BSC 240 (step 435). This call does not activate the ringing tone on the MS 200, and therefore, is not noticed by the MS 200.

The originating BSC 240 then determines which Base Transceiver Station (BTS) 220 is currently serving the MS 200 (step 440), and obtains a Timing Advance (TA) value (TA1), or other positioning data, from this serving BTS 220 (step 445), if possible. Thereafter, TA values are obtained from two target BTSs (210 and 230) (step 480) by performing a positioning handover (step 450). If the serving BTS 220 does not support positioning, an additional target BTS (not shown) must be selected. It should be noted that other positioning methods based on triangulation can be used instead of obtaining TA values, as discussed herein. In addition, positioning of the MS 200 can be performed using more than three BTSs (210, 220, and 230).

The positioning handover to one of the target BTSs 230 (step 450) is accomplished by the serving BSC 240 sending a new ACTIVATION TYPE in a CHANNEL ACTIVATION message to the target BTS 230, which informs the target BTS 230 that a positioning handover needs to be performed (step 455). The target BTS 230 then acknowledges the CHANNEL ACTIVATION message to the serving BSC 250 (step 460).

Thereafter, the BSC 240 sends a command to the MS 200 via the serving BTS 220 (step 465) to transmit a HANDOVER ACCESS message to the target BTS 230 (step 470). During the time that the MS 200 is waiting for a response from the target BTS 230, e.g., around 320 milliseconds, the target BTS 230 measures the Timing Advance value (access delay) (TA3) (step 475), using access bursts sent by the MS 200, and forwards this positioning data to the serving BSC 240 (step 480). A positioning handover can then be performed to the other target BTS 210 in the same manner as stated hereinbefore. The TA value measured by the target BTS 230 (TA3) is then transmitted by the serving BSC 250 to the MSC 260, together with TA values (TA1 and TA2) obtained from the serving BTS 220 and other target BTSs 210 (step 485).

Finally, the TA value acquired from the target BTS 230 (TA3), together with other TA values (TA1 and TA2) are forwarded to the serving Mobile Positioning Center (MPC) 270 from the MSC 260 (step 490), where the location of the MS 200 is determined using the triangulation algorithm (step 495). The MPC 270 then presents the geographical position of the MS 200 to the home MPC 275, which can then present the location information to the requesting application (node) 280 (step 498).

It should be noted that the location services can be used by applications located-in or connected-to the subscriber's MS, by network applications or by external applications. For example, when an application uses the location service for positioning of a particular MS, which is within a group of MSs allowed to be positioned by that application, the serving PLMN must know the MPC address of the serving PLMN and the MPC address of the subscriber's home PLMN since the list of MSs within the group which are allowed to be positioned by that application and the limits on that applications ability to position that subscriber are stored in the subscriber's home MPC. Therefore, by including the MPC address of the serving MPC in the location update operation to the home PLMN and the address of the home MPC in the subscriber data transfer operation to the serving PLMN, the authority of the requesting application to position that particular MS can be checked by the serving MPC, e.g., by interrogating the home MPC, prior to performing the positioning operation and sending the results to the requesting application.

As will be recognized by those skilled in the art, the innovative concepts described in the present application can be modified and varied over a wide range of applications. Accordingly, the scope of patented subject matter should not be limited to any of the specific exemplary teachings discussed.

What is claimed is:

1. A telecommunications system for determining a home address associated with a home mobile positioning center and a serving address associated with a serving mobile positioning center, said telecommunications system comprising:

a home location register connected to said home mobile positioning center for storing said home address of said home mobile positioning center; and a mobile switching center connected to said serving mobile positioning center for storing said serving address of said serving mobile positioning center, said serving address being sent from said mobile switching center to said home location register when a mobile terminal registered in said home location register enters a location area served by said mobile switching center, said mobile terminal being in wireless communication with said mobile switching center, said home address being sent from said home location register to said mobile switching center when said serving address is received by said home location register.

2. The telecommunications system of claim 1, further comprising a visitor location register connected to said mobile switching center, said serving address and said home address being stored in said visitor location register.

3. The telecommunications system of claim 2, wherein said visitor location register is integrated with said mobile switching center.

4. The telecommunications system of claim 1, wherein said serving address is sent to said home location register in a location update message.

5. The telecommunications system of claim 1, wherein said home address is sent to said mobile switching center in a subscriber data transfer message.

6. The telecommunications system of claim 1, wherein said home mobile positioning center retrieves said serving address of said serving mobile positioning center from said home location register when said home mobile positioning center receives a positioning request.

7. The telecommunications system of claim 6, wherein said home mobile positioning center sends said positioning request to said serving mobile positioning center using said serving address.

8. The telecommunications system of claim 7, wherein said serving mobile positioning center sends said positioning request to said mobile switching center, said positioning request including a positioning address, said mobile switching center verifying said positioning request by checking said positioning address against said home address and said serving address.

9. The telecommunications system of claim 8, wherein said positioning request is verified when said positioning address is said home address.

10. The telecommunications system of claim 8, wherein said positioning request is verified when said positioning address is said serving address.

11. The telecommunications system of claim 8, further comprising a base station system connected to said mobile switching center, said base station system obtaining positioning data associated with said mobile terminal, said base station system sending said positioning data to said mobile switching center, said mobile switching center sending said positioning data to said serving mobile positioning center for calculation of the location of said mobile terminal.

12. The telecommunications system of claim 11, further comprising a requesting node in communication with said home mobile positioning center, said serving mobile positioning center forwarding the location of said mobile terminal to said requesting node via said home mobile positioning center.

13. A method for determining a home address associated with a home mobile positioning center and a serving address associated with a serving mobile positioning center, said method comprising the steps of:

entering, by a mobile terminal registered in a home location register connected to said home mobile positioning center, a location area served by a mobile switching center, said mobile switching center being connected to said serving mobile positioning center, said mobile terminal being in wireless communication with said mobile switching center;

sending, by said mobile switching center, said serving address of said serving mobile positioning center to said home location register; and sending, by said home location register, said home address of said home mobile positioning center to said mobile switching center.

14. The method of claim 13, further comprising, after said step of sending said home address, the step of:

storing said serving address and said home address in a visitor location register connected to said mobile switching center.

15. The method of claim 13, wherein said visitor location register is integrated with said mobile switching center.

16. The method of claim 13, wherein said step of sending said serving address is performed by sending said serving address to said home location register in a location update message.

17. The method of claim 13, wherein said step of sending said home address is performed by sending said home address to said mobile switching center in a subscriber data transfer message.

18. The method of claim 13, further comprising, after said step of sending said home address, the steps of:

receiving, by said home mobile positioning center, a positioning request; and retrieving, by said home mobile positioning center, said serving address of said serving mobile positioning center from said home location register.

19. The method of claim 18, further comprising, after said step of retrieving, the step of:

sending, by said home mobile positioning center, said positioning request to said serving mobile positioning center using said serving address.

20. The method of claim 19, further comprising, after said step of sending said positioning request to said serving mobile positioning center, the steps of:

sending, by said serving mobile positioning center, said positioning request to said mobile switching center, said positioning request including a positioning address; and verifying, by said mobile switching center, said positioning request by checking said positioning address against said home address and said serving address.

21. The method of claim 20, wherein said positioning request is verified when said positioning address is said home address.

22. The method of claim 20, wherein said positioning request is verified when said positioning address is said serving address.

23. The method of claim 20, further comprising, after said step of verifying, the steps of:

obtaining, by a base station system connected to said mobile switching center, positioning data associated with said mobile terminal;

sending, by said base station system, said positioning data to said mobile switching center;

sending, by said mobile switching center, said positioning data to said serving mobile positioning center; and calculating, by said serving mobile positioning center, the location of said mobile terminal.

24. The method of claim 23, further comprising, after said step of calculating, the step of:

forwarding, by said serving mobile positioning center, the location of said mobile terminal to a requesting node via said home mobile positioning center.

* * * * *